United States Patent
Hossfeld et al.

(10) Patent No.: US 9,657,652 B2
(45) Date of Patent: May 23, 2017

(54) VALVE ASSEMBLY AND EXHAUST GAS SYSTEM

(71) Applicant: Faurecia Emissions Control Technologies, Germany GmbH, Augsburg (DE)

(72) Inventors: Hans-Christoph Hossfeld, Westendorf (DE); Arthur Wurzer, Aichach (DE)

(73) Assignee: Faurecia Emissions Control Technologies, Germany GmbH, Augsburg (DE)

( * ) Notice: Subject to any disclaimer, the term of this patent is extended or adjusted under 35 U.S.C. 154(b) by 97 days.

(21) Appl. No.: 14/450,382

(22) Filed: Aug. 4, 2014

(65) Prior Publication Data

US 2015/0034192 A1     Feb. 5, 2015

(30) Foreign Application Priority Data

Aug. 5, 2013  (DE) .................. 10 2013 108 426

(51) Int. Cl.
*F16K 11/074*      (2006.01)
*F02D 9/10*        (2006.01)
(Continued)

(52) U.S. Cl.
CPC ............. *F02D 9/1095* (2013.01); *F01N 5/02* (2013.01); *F02M 26/26* (2016.02); *F02M 26/32* (2016.02);
(Continued)

(58) Field of Classification Search
CPC .... F16K 11/052; F16K 11/0525; F01N 3/031; F01N 2240/36; F01N 5/02; F02D 41/0047; F02D 9/104
(Continued)

(56) References Cited

U.S. PATENT DOCUMENTS 83,808 A * 11/1868 Young .................. F16K 11/052
                                                137/875
1,215,185 A * 2/1917 Petry ..................... F16K 11/052
                                                137/625.44
(Continued)

FOREIGN PATENT DOCUMENTS

EP      0947750 A2    6/1999
FR      2914978 A1   10/2008
(Continued)

OTHER PUBLICATIONS

FR search report dated Apr. 21, 2016; and English summary of FR search report.

*Primary Examiner* — Kevin Murphy
*Assistant Examiner* — Angelisa L Hicks
(74) *Attorney, Agent, or Firm* — Carlson, Gaskey & Olds, PC

(57) ABSTRACT

A valve assembly has a housing with a first inlet, a second inlet, a first outlet, and a second outlet. A first flow path is between the first inlet and the first outlet, a second flow path is between the second inlet and the first outlet, and a third flow path is between the first inlet and the second outlet. A closure element is movably supported in the housing and in a by-pass position opens the first flow path and closes at least the second flow path, and in a normal position closes the first flow path and opens the second flow path and the third flow path. A flow guiding element is on the closure element, and which in the normal position protrudes into the second flow path and is coupled to the closure element to urge, in a gas flow from the second inlet to the first outlet, the closure element into the normal position. An exhaust gas system includes the valve assembly and an exhaust gas heat exchanger.

13 Claims, 2 Drawing Sheets

(51) Int. Cl.
*F16K 11/052* (2006.01)
*F01N 5/02* (2006.01)
*F02M 26/26* (2016.01)
*F02M 26/32* (2016.01)

(52) U.S. Cl.
CPC ........ *F16K 11/052* (2013.01); *F01N 2240/36* (2013.01); *F01N 2410/02* (2013.01); *Y02T 10/16* (2013.01); *Y10T 137/86847* (2015.04)

(58) Field of Classification Search
USPC ............... 137/625.44, 875, 512, 625.29; 123/568.12
See application file for complete search history.

(56) References Cited

U.S. PATENT DOCUMENTS

| | | | |
|---|---|---|---|
| 1,256,069 A | | 2/1918 | Speckman |
| 2,856,952 A | * | 10/1958 | Stillwagon .......... F16K 11/0525 137/375 |
| 4,361,170 A | | 11/1982 | Peloza |
| 5,657,731 A | * | 8/1997 | Kim ...................... F02D 9/1095 123/336 |
| 5,687,764 A | * | 11/1997 | Tanaka ................ F16K 11/0525 137/625.43 |
| 7,900,610 B2 | * | 3/2011 | Okawa ...................... 123/568.12 |
| 8,230,681 B2 | * | 7/2012 | Kobayashi ............... 123/568.12 |
| 8,230,682 B1 | | 7/2012 | Sanford et al. |
| 2002/0179165 A1 | * | 12/2002 | Hu .......................... F01P 7/167 137/875 |
| 2003/0115860 A1 | | 6/2003 | May et al. |
| 2003/0192606 A1 | | 10/2003 | Heckt |
| 2005/0039729 A1 | | 2/2005 | Rosin |
| 2009/0235654 A1 | | 9/2009 | Kobayashi |

FOREIGN PATENT DOCUMENTS

| | | | |
|---|---|---|---|
| JP | WO 9524577 A1 * | 9/1995 | .......... F16K 11/0525 |
| WO | 2004097192 | 11/2004 | |
| WO | 2009151681 | 12/2009 | |

* cited by examiner

VALVE ASSEMBLY AND EXHAUST GAS SYSTEM

RELATED APPLICATION

This application claims priority to DE 10 2013 108 426.5, filed Aug. 5, 2013.

TECHNICAL FIELD

The invention relates to a valve assembly comprising a housing with a first and a second inlet as well as a first and a second outlet, wherein a first flow path is provided between the first inlet and the first outlet, a second flow path is provided between the second inlet and the first outlet, and a third flow path is provided between the first inlet and the second outlet. Further, the valve assembly comprises a closure element that is supported in the housing to be movable, in particular pivotable, which closure element in a by-pass position opens the first flow path and closes at least the second flow path, and in a normal position closes the first flow path and opens the second and third flow paths. Further, the invention relates to an exhaust gas system having such a valve assembly.

BACKGROUND

Exhaust gas systems for motor vehicles include, for example, heat exchangers in order to be able to utilise the heat of the exhaust gas originating from the internal combustion engine. The exhaust gas flows from the internal combustion engine through the heat exchanger and transfers the heat thereto, for example for pre-heating media, in order to achieve a more rapid heating of the engine, or for heating the passenger compartment.

The exhaust gas originating from the combustion engine can, as a function of the required heat output of the heat exchanger, flow through or be guided past the heat exchanger.

The exhaust gas heat exchanger is connected to the exhaust gas pipe, for example, using a valve assembly. The valve assembly includes two inlets as well as two outlets and the exhaust gas pipe is connected to a first inlet and a first outlet. The heat exchanger is connected to a second inlet and to a second outlet. In the valve assembly, a closure element is provided which in a by-pass position opens the first flow path and closes the second flow path and/or the third flow path, and in a normal position closes the first flow path and opens the second flow path as well as the third flow path. In the by-pass position, the exhaust gas can be guided past the exhaust gas heat exchanger without flowing through it. In the normal position, the exhaust gas flows at least partially through the exhaust gas heat exchanger.

However, in order to actuate the closure element, great operating forces are required, because the closure element has to be moved against the flow of the exhaust gas into the normal position and has to be kept there. Moreover, in the case of the valve assemblies known so far, an undesired pressure differential or turbulence may occur on the closure element of the valve assembly.

SUMMARY

It is the object of the invention to provide a valve assembly as well as an exhaust gas system having such a valve assembly, which requires lower operating forces and which reduces or prevents turbulence in the flow paths.

In order to achieve this object, a valve assembly has a housing with a first inlet, a second inlet, a first outlet, and a second outlet. A first flow path is provided between the first inlet and the first outlet, a second flow path is provided between the second inlet and the first outlet, and a third flow path is provided between the first inlet and the second outlet. Furthermore, the valve assembly has a closure element that is supported in the housing to be movable, in particular pivotable, which closure element in a by-pass position opens the first flow path and closes at least the second flow path, and in a normal position closes the first flow path and opens the second flow path as well as the third flow path. A flow guiding element is provided on the closure element, which flow guiding element in the normal position of the closure element protrudes into the second flow path and is coupled to the closure element in such a way that the flow guiding element urges, in a gas flow from the second inlet to the first outlet, the closure element into the normal position.

The flow guiding element may be integrally formed with the closure element or may be formed by one of the sides of the closure element itself. However, it is preferably implemented as a separate component.

The closure element may, for example, include two flaps which are mounted at an angle relative to each other, wherein in the by-pass position, the first flap closes the third flow path and the second flap closes the second flow path, and in the normal position, the second flap closes the first flow path. As a result of the two flaps it is therefore possible to close both the second and the third flow paths, i.e. both flow paths to the exhaust gas heat exchanger. As a result, in the bypass position only flow through the first flow path is possible, so that any turbulence on the second or third flow path can be reliably prevented. Both flaps can be pivoted about a common pivot axis which is preferably formed in the region of the connection of the two flaps, so that both flow paths can be closed by a single drive.

In order to achieve an improved sealing of the flow paths, a valve seat for the first or the second flap is preferably provided in each of the flow paths, on which valve seat the flap can in each case tightly rest.

The valve seats may be made, for example, from a metal sheet, against which the first or the second flap may rest, which metal sheet includes a flow opening that can be closed by the first or the second flap. The metal sheet can be provided in the respective flow path in such a way that the flap can in each case come to rest against the metal sheet in an extensive manner by swivelling, so that a reliable sealing is possible. Moreover, as a result of such a valve seat, the opening the respective flap has to close in the flow path is smaller. As a result, the flap may be dimensioned to be smaller so that it becomes easier to swivel within the housing of the valve assembly.

The flow opening is preferably greater than the flow guiding element, so that during the swivelling of the closure element, the flow guiding element can be pivoted by the valve seats. As a result, the flow guiding element can be pivoted out of the first flow path in the by-pass position, so that the latter does not influence the gas flow in the by-pass position.

The housing preferably includes three flow sections, wherein the first inlet is associated with a first flow section, the first outlet is associated with a second flow section, and the second inlet as well as the second outlet are associated with a third flow section and are separated from each other by a metal sheet. The first and second flow sections may, for example, jointly form a straight pipe section that is inserted into an exhaust gas line. The third flow section is connected at an angle to this pipe section. Since only one connection is provided for feeding and discharging the exhaust gas heat exchanger, a substantially simpler connection of the exhaust gas heat exchanger or of the pipe leading to the heat exchanger is possible. It is only necessary for one pipe section, which is preferably subdivided in the longitudinal direction in a feed and a discharge pipe for the exhaust gas heat exchanger, to be connected to the valve assembly. Depending on the connections of the exhaust gas heat exchanger, this pipe section may branch off into two pipes. However, it is also possible for just one connection to be provided on the heat exchanger, which connection is preferably subdivided into two pipes within a flange for connection to the valve assembly.

In the metal sheet that separates the second outlet from the second inlet, a recess may be provided, for example, that is closed by the closure element, in particular by the first flap, in the normal position of the closure element.

In the by-pass position, the flow guiding element preferably does not protrude into the first flow path, so that in the by-pass position, the flow of the exhaust gas is not influenced by the flow guiding element.

An exhaust gas system includes a valve assembly, as described above, and also includes an exhaust gas heat exchanger. The exhaust gas heat exchanger is connected to the second inlet and to the second outlet of the valve assembly, and in the normal position of the closure body, the exhaust gas can flow through the exhaust gas heat exchanger.

DETAILED DESCRIPTION

Figure 1:
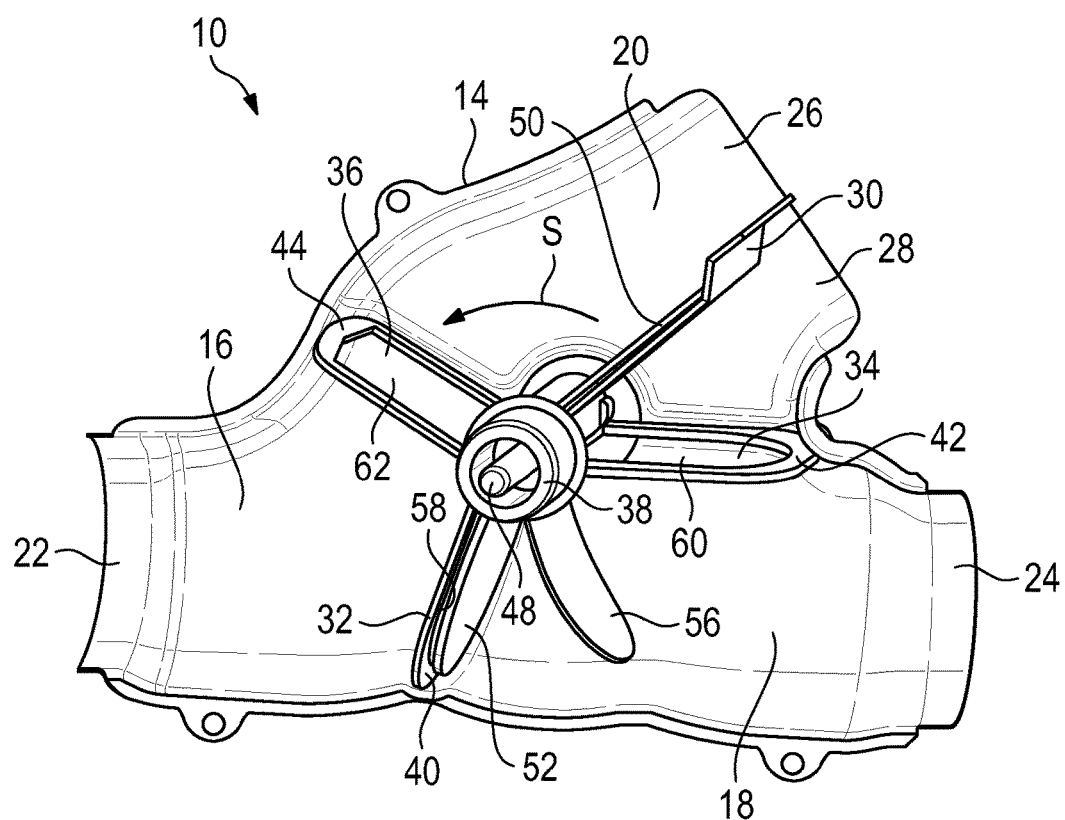
FIG. 1 shows a sectional view through a valve assembly according to the invention.
Figure 2:
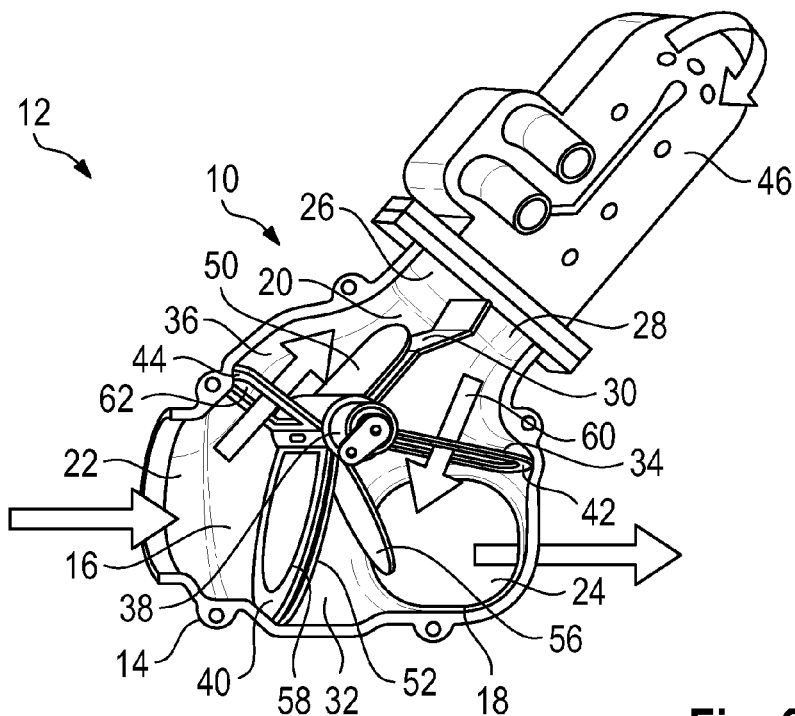
FIG. 2 shows a perspective sectional view of an exhaust gas system according to the invention including the valve assembly from FIG. 1 in a normal position of the closure element.
Figure 3:
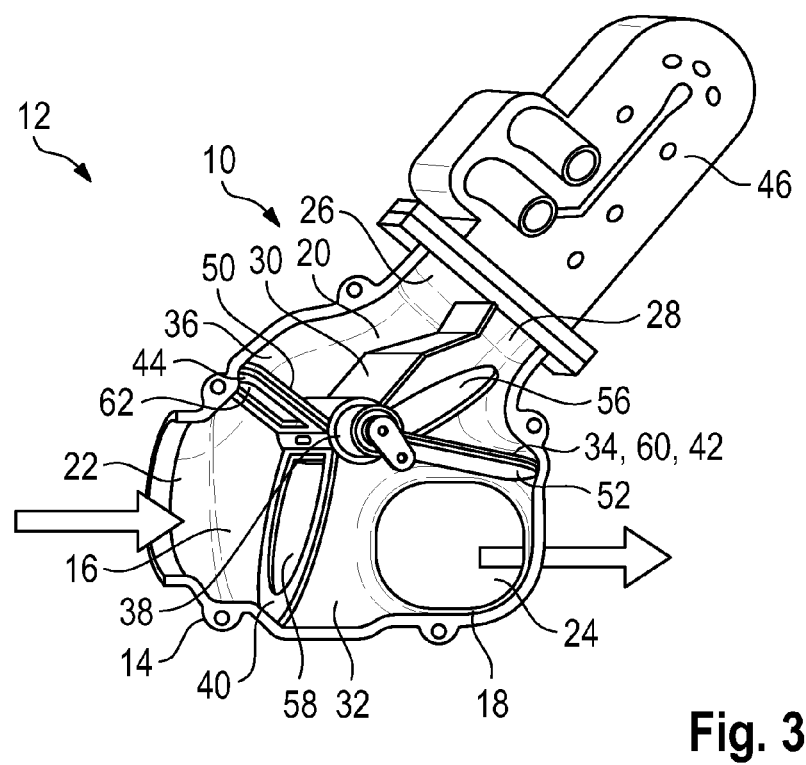
FIG. 3 shows the exhaust gas system from FIG. 2 in the by-pass position of the closure element.

FIG. 1 shows a valve assembly 10 for the part of an exhaust gas system 12 that is shown in FIGS. 2 and 3.

The valve assembly 10 has a housing 14 that is substantially made up of a first flow section 16, a second flow section 18 as well as a third flow section 20. The longitudinal directions of the first flow section 16 and the second flow section 18 coincide in this embodiment. However, it is also possible for the longitudinal directions of the first flow section 16 and the second flow section 18 to have different orientations. The third flow section 20 is provided at an angle of approximately 135° to the longitudinal direction of the first and second flow sections 16, 18. Irrespective of this, the angle of the third flow section 20 may be between 0 and 180° relative to the first flow section 16 and/or the second flow section 18.

The first flow section 16 includes a first inlet 22, and the second flow section 18 includes a first outlet 24. The third flow section 20 is subdivided into two channels by a metal sheet 30 in the longitudinal direction, which channels form a second outlet 26 as well as a second inlet 28.

In the housing 14, three flow paths 32, 34, 36 are formed. A first flow path 32 extends from the first inlet 22 to the first outlet 24, a second flow path 34 extends from the second inlet 28 to the first outlet 24, and a third flow path 36 extends from the first inlet 22 to the second outlet 26.

Further, a closure element 38 as well as three valve seats 40, 42, 44 for the closure element 38, which are located in the flow paths 32, 34, 36, are provided in the housing 14, through which the flow paths 32, 34, 36 can be closed, as will be explained below.

The first inlet 22 is connected to an exhaust gas pipe that leads away from an internal combustion engine. On the first outlet 24, a continuing exhaust gas pipe (not shown) is connected. The continuing exhaust gas pipe may for example lead to an exhaust gas cleaning system or to an exhaust gas return pipe.

On the second outlet 26 as well as on the second inlet 28, an exhaust gas heat exchanger 46 is provided. In this exhaust gas heat exchanger 46, heat from the exhaust gas flowing out of the internal combustion engine can be transferred, for example for preheating media, in order to achieve a more rapid heating of the internal combustion engine, or for heating the internal passenger compartment of the vehicle.

Depending on the position of the closure element 38, the exhaust gas originating from the internal combustion engine can be passed on directly through the first flow path 32 or can be passed through the exhaust gas heat exchanger 46 along the second flow path 34 and the third flow path 36.

Opening and closing of the flow paths 32, 34, 36 is carried out by way of the closure element 38 which is supported in the housing 14 so that it can swivel about a rotary axis 48. To this end, the closure element 38 has a first flap 50 as well as a second flap 52, which are provided at an angle of here approximately 135° relative to each other.

As can be seen in particular in FIG. 1, the valve seats 40, 42, 44 are each formed from a metal sheet, against which the first flap 50 or the second flap 52 can rest. Each of the metal sheets has a flow opening 58, 60, 62. The flow openings 58, 60, 62 can be closed by the first flap 50 or the second flap 52, as will be explained below.

In the normal position shown in FIGS. 1 and 2, the second flap 52 rests against the valve seat 40 that is provided in the first flow path 32, and as a result closes the first flow path 32. The first flap 50 rests against the metal sheet 30 that separates the second outlet 26 from the second inlet 28.

Thus, in this normal position of the closure element 38, the second and third flow paths 34, 36 are opened and the first flow path 32 is closed. The exhaust gas flows from the first inlet 22 via the third flow path 36 and the second outlet 26 into the exhaust gas heat exchanger 46 and from there via the second inlet 28, the second flow path 34 and the first outlet 24 into the exhaust gas pipe. The exhaust gas flowing out of the internal combustion engine can therefore transfer heat to the exhaust gas heat exchanger 46.

From this normal position, the closure element can be pivoted in a pivoting direction S into a by-pass position as shown in FIG. 3, in which the exhaust gas is guided past the heat exchanger into the continuing exhaust gas pipe, so that no heat is transferred to the exhaust gas heat exchanger 46. In the by-pass position, the first flap 50 rests against the valve seat 44 in the third flow path 36 and the second flap 52 rests against the valve seat 42 in the second flow path 34. Thus, the second flow path 34 and the third flow path 36 are closed and the first flow path 32 is opened. The exhaust gas cannot flow through the exhaust gas heat exchanger 46 but is passed into the continuing exhaust gas pipe along the first flow path 32.

In the normal position of the closure element 38, the exhaust gas flowing out of the internal combustion engine impinges onto the side of the second flap 52 that faces towards the first inlet and urges this flap in the pivoting direction S. In order to keep the second flap 52 and thus the closure element 38 in the normal position, great holding forces are therefore required.

Moreover, turbulence and pressure differentials may occur in the second flow path 34 as the result of the deflection of the gas flow.

In order to reduce these effects, a flow guiding element 56 is provided on the closure element 38, which in the embodiment shown here is formed by a metal sheet that is mounted on the closure element 38 at an acute angle to the second flap 52. The flow guiding element 56 is further curved away from the second flap 52.

As can be seen in FIG. 2, in the normal position of the closure element 38, the flow guiding element 56 protrudes into the second flow path 34. The gas flowing out of the exhaust gas heat exchanger 46 impinges in the second flow path 34 onto the flow guiding element 56 and urges the latter with a force that acts in a direction opposite to the pivoting direction S. In this way, the closure element 38 coupled to the flow guiding element 56 is urged in a direction opposite to the pivoting direction S against the valve seat 40 in the first flow path 32, i.e. in the normal position. As a result, low forces are required to pivot the closure element 38 in a direction opposite to the pivoting direction S and to keep it there.

Further, the gas exiting from the exhaust gas heat exchanger 46 is deflected by the flow guiding element 56 in the direction of the first outlet 24, so that no or only low turbulence or pressure differentials occur in the area of the closure element 38.

As a result of the flow guiding element 56 protruding into the second flow path 34, therefore, substantially lower forces are required in order to keep the closure element 38 in the normal position. Moreover, the gas flow within the valve assembly 10 is positively influenced by the flow guiding element 56.

As can be seen in FIG. 3, in the by-pass position of the closure element 38, the flow guiding element 56 is not located in the first flow path 32, so that in the by-pass position of the closure element 38, the exhaust gas flow is not influenced. Moreover, since no force acts on the flow guiding element 56, the closure element 38 can be kept in the by-pass position with a very low holding force.

As soon as the closure element 38 is swivelled into the normal position in a direction opposite to the pivoting direction S and part of the exhaust gas can flow through the third flow path 36 as well as the second flow path 34, the gas impinging onto the flow guiding element 56 exerts a force on the closure element 38 in a direction opposite to the pivoting direction S, as a result of which the latter can be swivelled into the normal position with a lower force.

The flow opening 60 of the valve seat 42 in the second flow path 34 is greater than the flow guiding element 56, so that during the swivelling of the closure element 38, the flow guiding element 56 can be passed from the normal position into the by-pass position through the flow opening 60.

By contrast to the embodiment shown here, the valve seats 40, 42, 44 may also be formed by different elements mounted in the housing 14. In particular, the valve seats 40, 42, 44 may also be formed by the housing 14. It merely has to be ensured that the flaps 50, 52 rest tightly against the valve seats 40, 42, 44 and that the flow openings 58, 60, 62 and thus the flow paths 32, 34, 36 can be closed. Moreover, depending on the orientation of the flaps 50, 52 and of the flow guiding element 56, it has to be ensured that the flow guiding element 56 can be pivoted in particular through the flow opening 60 of the valve seat 42 in the second flow path 34.

The flow guiding element 56 may have any desired shape, by which in the normal position the closure element 38 is urged upon impingement of the gas flow through the second flow path 34, and the gas flowing out of the exhaust gas heat exchanger 46 is deflected to the first outlet 24. The flow guiding element 56 may, for example, be formed by a solid body that is provided on the second flap. In particular, the shape of the flow guiding element 56 may be selected such that an effective deflection of the exhaust gas flow is achieved.

The second inlet 28 and the second outlet 26 may be provided in separate flow sections, so that two lines are connected which lead to the exhaust gas heat exchanger.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A valve assembly, comprising:
   a housing with a first inlet, a second inlet, a first outlet, and a second outlet;
   wherein a first flow path is provided between the first inlet and the first outlet, a second flow path is provided between the second inlet and the first outlet, and a third flow path is provided between the first inlet and the second outlet;
   a closure element that is supported in the housing to be movable, the closure element in a by-pass position opens the first flow path and closes at least the second flow path, and in a normal position closes the first flow path and opens the second flow path as well as the third flow path; and
   a flow guiding element provided on the closure element, which flow guiding element in the normal position of the closure element protrudes into the second flow path and is coupled to the closure element in such a way that the flow guiding element urges, in a gas flow from the second inlet to the first outlet, the closure element into the normal position, and wherein the flow guiding element is implemented as a separate component on the closure element, and wherein the flow guiding element comprises a metal sheet that is attached to the closure element; and
   wherein the closure element includes first and second flaps circumferentially spaced apart from each other, and wherein the first flap closes the third flow path in the bypass position and the second flap closes the first flow path in the normal position, and wherein the flow guiding element is mounted to the closure element to be positioned at an acute angle relative to the second flap, and wherein the second flap closes the second flow path in the bypass position.

2. The valve assembly as set forth in claim 1, wherein the first and second flaps are provided at an angle relative to each other.

3. The valve assembly as set forth in claim 1, wherein in each of the flow paths, a valve seat is provided for one of the first flap and the second flap.

4. The valve assembly as set forth in claim 3, wherein the valve seats are formed from a metal sheet, against which one of the first flap and the second flap can rest, wherein the metal sheet has a flow opening that can be closed by one of the first flap and the second flap.

5. The valve assembly as set forth in claim 4, wherein the flow opening is greater than the flow guiding element.

6. The valve assembly as set forth in claim 1, wherein the housing has three flow sections, and wherein the first inlet is associated with a first flow section and the first outlet is associated with a second flow section, and the second inlet as well as the second outlet are associated with a third flow section and are separated from each other by a metal sheet.

7. The valve assembly as set forth in claim 1, wherein in the by-pass position, the flow guiding element does not protrude into the first flow path.

8. The valve assembly as set forth in claim 1, wherein the closure element is pivotable within the housing.

9. The valve assembly according to claim 1 including a first valve seat positioned between the first inlet and the first outlet, a second valve seat positioned between the second inlet and the first outlet, and a third valve seat positioned between the first inlet and the second outlet, and wherein the first flap engages the third valve seat and the second flap engages the second valve seat when in the bypass position, and wherein the second flap engages the first valve seat when in the normal position.

10. The valve assembly according to claim 9 wherein the second valve seat includes an opening through which the flow guiding element passes when the flow guiding element moves between the normal and bypass positions.

11. An exhaust gas system comprising:
a valve assembly comprising a housing with a first inlet, a second inlet, a first outlet, and a second outlet, wherein a first flow path is provided between the first inlet and the first outlet, a second flow path is provided between the second inlet and the first outlet, and a third flow path is provided between the first inlet and the second outlet, a closure element that is supported in the housing to be movable, the closure element in a by-pass position opens the first flow path and closes at least the second flow path, and in a normal position closes the first flow path and opens the second flow path as well as the third flow path, and a flow guiding element provided on the closure element, which flow guiding element in the normal position of the closure element protrudes into the second flow path and is coupled to the closure element in such a way that the flow guiding element urges, in a gas flow from the second inlet to the first outlet, the closure element into the normal position, and wherein the flow guiding element is implemented as a separate component on the closure element and comprises a metal sheet that is attached to the closure element, and wherein the closure element includes first and second flaps circumferentially spaced apart from each other, and wherein the first flap closes the third flow path in the bypass position and the second flap closes the first flow path in the normal position, and wherein the flow guiding element is mounted to the closure element to be positioned at an acute angle relative to the second flap, and wherein the second flap closes the second flow path in the bypass position; and
an exhaust gas heat exchanger, wherein the exhaust gas heat exchanger is connected to the second inlet and to the second outlet of the valve assembly and in the by-pass position of the closure element, the exhaust gas can flow through the exhaust gas heat exchanger.

12. The exhaust gas system according to claim 11 including a first valve seat positioned between the first inlet and the first outlet, a second valve seat positioned between the second inlet and the first outlet, and a third valve seat positioned between the first inlet and the second outlet, and wherein the first flap engages the third valve seat and the second flap engages the second valve seat when in the bypass position, and wherein the second flap engages the first valve seat when in the normal position.

13. The exhaust gas system according to claim 12 wherein the second valve seat includes an opening through which the flow guiding element passes when the flow guiding element moves between the normal and bypass positions.

\* \* \* \* \*